United States Patent
Wendelrup et al.

(12) 
(10) Patent No.: US 6,677,727 B1
(45) Date of Patent: Jan. 13, 2004

(54) METHOD OF SYNCHRONIZING COMMUNICATIONS MEANS IN A BATTERY TO COMMUNICATIONS MEANS IN AN ELECTRONIC DEVICE, AN APPARATUS, AND A BATTERY

(75) Inventors: Heino Wendelrup, Malmö (SE); Michael Kellerman, Åkarp (SE); Johan Mercke, Lund (SE); Kristoffer Ptasinski, Lund (SE); Charles Forsberg, Skurup (SE); Jonas Bengtsson, Lund (SE); Jan Rubbmark, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/491,287

(22) Filed: Jan. 25, 2000

(30) Foreign Application Priority Data

Jan. 27, 1999 (SE) .................................. 9900305

(51) Int. Cl.$^7$ .................................................. H02J 7/14
(52) U.S. Cl. ...................... 320/112; 320/114; 320/133; 320/134; 370/512; 370/514; 370/520; 375/360; 375/365; 375/370
(58) Field of Search ................................ 375/354, 359, 375/360, 365, 369, 370; 370/503, 509, 512, 514, 520; 320/114, 132, 133, 134, 112

(56) References Cited

U.S. PATENT DOCUMENTS

| | | | | |
|---|---|---|---|---|
| 4,241,398 A | | 12/1980 | Carll | 364/200 |
| 5,541,489 A | | 7/1996 | Dunstan | 320/2 |
| 5,635,813 A | * | 6/1997 | Shiga et al. | 320/106 |
| 5,654,983 A | | 8/1997 | Sauser, Jr. | 375/225 |
| 5,796,239 A | | 8/1998 | van Phuoc et al. | 320/107 |
| 5,831,350 A | * | 11/1998 | McConkey et al. | 307/150 |
| 6,173,350 B1 | * | 1/2001 | Hudson et al. | 710/100 |
| 6,211,644 B1 | * | 4/2001 | Wendelrup et al. | 320/106 |
| 7,291,966 | * | 9/2001 | Wendelrup et al. | 320/106 |
| 6,434,194 B1 | * | 8/2002 | Eisenberg et al. | 375/238 |

* cited by examiner

*Primary Examiner*—Stephen Chin
*Assistant Examiner*—Dac V. Ha
(74) *Attorney, Agent, or Firm*—Jenkens & Gilchrist, P.C.

(57) ABSTRACT

Method and apparatus for synchronizing communication between a battery and an electronic device are disclosed. Bytes consisting of a number of bits are transmitted between the electronic device and the battery. A predetermined bit sequence is appended to at least some of the bytes prior to transmission. The time interval between given shifts in the predetermined bit sequence is used to synchronize the communication.

26 Claims, 4 Drawing Sheets

METHOD OF SYNCHRONIZING COMMUNICATIONS MEANS IN A BATTERY TO COMMUNICATIONS MEANS IN AN ELECTRONIC DEVICE, AN APPARATUS, AND A BATTERY

BACKGROUND OF THE INVENTION

1. Field of the Invention

The present invention relates to a method of synchronizing a second communications means in a battery attached to an electronic device to a first communications means in said electronic device, wherein bytes consisting of a number of bits are transmitted between said electronic device and said battery by means of said first and second communications means using digital, serial communication. The invention further relates to a corresponding apparatus and a corresponding battery.

2. Description of the Related Art

In recent years the cellular telephone technology has developed rapidly and thus created a similar need for development in the area of batteries and battery packs, and more specifically, for communicating between a battery and an electronic device, such as a cellular telephone. Cellular telephones must utilize batteries in order to provide mobile capabilities. The battery is critical to the user of a cellular telephone, since the battery provides the ability to move about freely without being tied to a stationary power source.

Thus, in order to maximize the use of a cellular telephone, and other portable electronic devices, it is important that a user achieves maximum performance from the attached battery. This may be achieved by correctly charging the battery and always being able to identify the exact charging status of the battery. This enables the user to know how much standby time is left on the phone. This type of information enables the user to intelligently decide whether the charge in a battery is sufficient for his needs, or whether charging of the battery is required.

Recent developments of battery and battery pack related technologies have provided users with so-called "smart" batteries which can provide a user with a power source for an electronic device and further provide data transmission capabilities between the battery and the attached electronic device. This type of batteries may contain storage means adapted to store various data representing information which may be presented to a user, e.g. in a display of the portable device. The information in a battery can include different information such as an identification number, the maximum capacity, the present capacity, and other relevant information.

Some information from the battery is only used internally in the portable electronic device, while other information from the battery can be presented to the user, e.g. after having been processed by a processor in the battery or in the portable electrical device. For example, the stored information about the maximum capacity of the battery may be used in the electronic device only, while the present capacity may be calculated by the electronic device using the maximum capacity (or a previous value of the present capacity) and knowledge about the power consumption of the electronic device.

Therefore data is exchanged between the electronic device and the battery. This data exchange is normally performed using means enabling digital, serial asynchronous communication over an interface between communications means in the electronic device and communications means in the battery.

When using batteries which hold a number of different data, it is of interest to use bi-directional communications means enabling data to be transmitted in both directions. For example when the electronic device acts as a master and the battery as a slave, the electronic device can retrieve desired information by sending a command to the battery and receive data from the battery in response.

In order to communicate, the communications means in the electronic device and the communications means in the battery have to be synchronized as there is an absolute limit for the acceptable timing variations between these communications when the transmitted signals have to be received correctly. The baud rate of serial asynchronous communication in compact systems is often fixed. This implies that both units need exact crystals to ensure stable timing. This has the drawback of being an expensive solution and is therefore normally of no interest in relation to portable electronic devices and batteries where the price is an important parameter. Further, the use of crystals in batteries when minimizing the size of batteries is of interest.

The object of the invention is to provide a method of the above-mentioned type which is simpler and cheaper compared to methods according to the prior art.

SUMMARY OF THE INVENTION

This object is achieved according to the invention by a method in which a predetermined bit sequence is appended to at least some bytes prior to the transmission from said first communications means to said second communications means, said bit sequence is detected in the signal received by said second communication means, the time interval between given shifts in the detected bit sequence is measured, and said synchronization is performed by means of said measured time interval.

Hereby, as synchronization based on said measured time interval can be performed continuously, a baud rate timing can be performed in the battery by use of less stable, simpler and less expensive oscillation circuits compared to the use of expensive crystals according to the prior art.

Preferably, said appended bit sequence is transmitted prior to the transmission of the remaining bits in said byte, and said synchronization is performed prior to receiving said remaining bits.

Preferably, said bit sequence includes two bits of different value, and said time interval is specified by a shift defining the beginning of the first bit and a shift between said two bits. By reducing the amount of bit appended bytes used for synchronizing purposes the amount of bits to be transmitted is reduced.

Preferably, every one of said bytes includes said appended predetermined bit sequence. As a result, the synchronization can be performed each time a byte is received.

In another embodiment at least one of said bytes does not include an appended predetermined bit sequence. Hereby the total amount of bits transmitted can be reduced.

As mentioned, the present invention also relates to an apparatus comprising an electronic device, a battery attached thereto, means enabling digital, serial communication over an interface between the electronic device and the battery, and comprising first communications means in the electronic device and second communications means in the battery, said digital, serial communication comprising transmission of bytes consisting of a number of bits between said first and second communications means.

In an apparatus according to the invention said first communications means is adapted to append a predetermined bit sequence having at least two shifts to at least some bytes prior to the transmission to said second communications means, said second communications means are further adapted to detect said bit sequence in a received signal, to measure the time interval between given shifts in said bit sequence, and to synchronize said second communications means to said first communications means by means of said measured time interval.

Hereby, as synchronization based on said measured time interval can be performed continuously, a baud rate timing can be performed in the battery by means of less stable, simpler and less expensive oscillation circuits compared to the use of expensive crystals according to the prior art.

In accordance with one embodiment, said first communications means is adapted to transmit said appended bit sequence prior to the transmission of the remaining bits in said byte, and said second communications means is adapted to perform said synchronization prior to receiving said remaining bits. Hereby it is ensured said second communications means has just been synchronized to said first communications means when the remaining bits are received.

Preferably, said first communications means is adapted to append a predetermined bit sequence including two bits of different values, and that said second communications means is adapted to perform said synchronization based on a time interval specified by a shift defining the beginning of the first bit and a shift between said two bits. By reducing the amount of bit appended bytes used for synchronizing purposes the amount of bits to be transmitted is reduced.

In accordance with a preferred embodiment, said first communications means is adapted to append said predetermined bit sequence to every one of said bytes.

In accordance with another preferred embodiment, said first communications means is adapted to append said predetermined bit sequence to some of said bytes while other bytes are not appended to said predetermined bit sequence.

Preferably, said electronic device is a cellular telephone.

The present invention further relates to a battery comprising means enabling digital, serial communication over an interface between the battery and an electronic device, and comprising communications means in the battery, said digital, serial communication comprising transmission of bytes consisting of a number of bits to and from said communication means.

In a battery according to the invention said communications means includes synchronization means adapted to detect a predetermined bit sequence in a received byte, to measure the time interval between given shifts in said bit sequence, and to synchronize said communication means in accordance with the measured time interval. Hereby the communications means of the battery can be synceronized in accordance with a received signal, resulting in a simpler and less expensive solution compared to the prior art.

BRIEF DESCRIPTION OF THE DRAWINGS

The present invention will now be described more fully with reference to the drawings, in which.

DETAILED DESCRIPTION OF THE INVENTION

Figure 1:
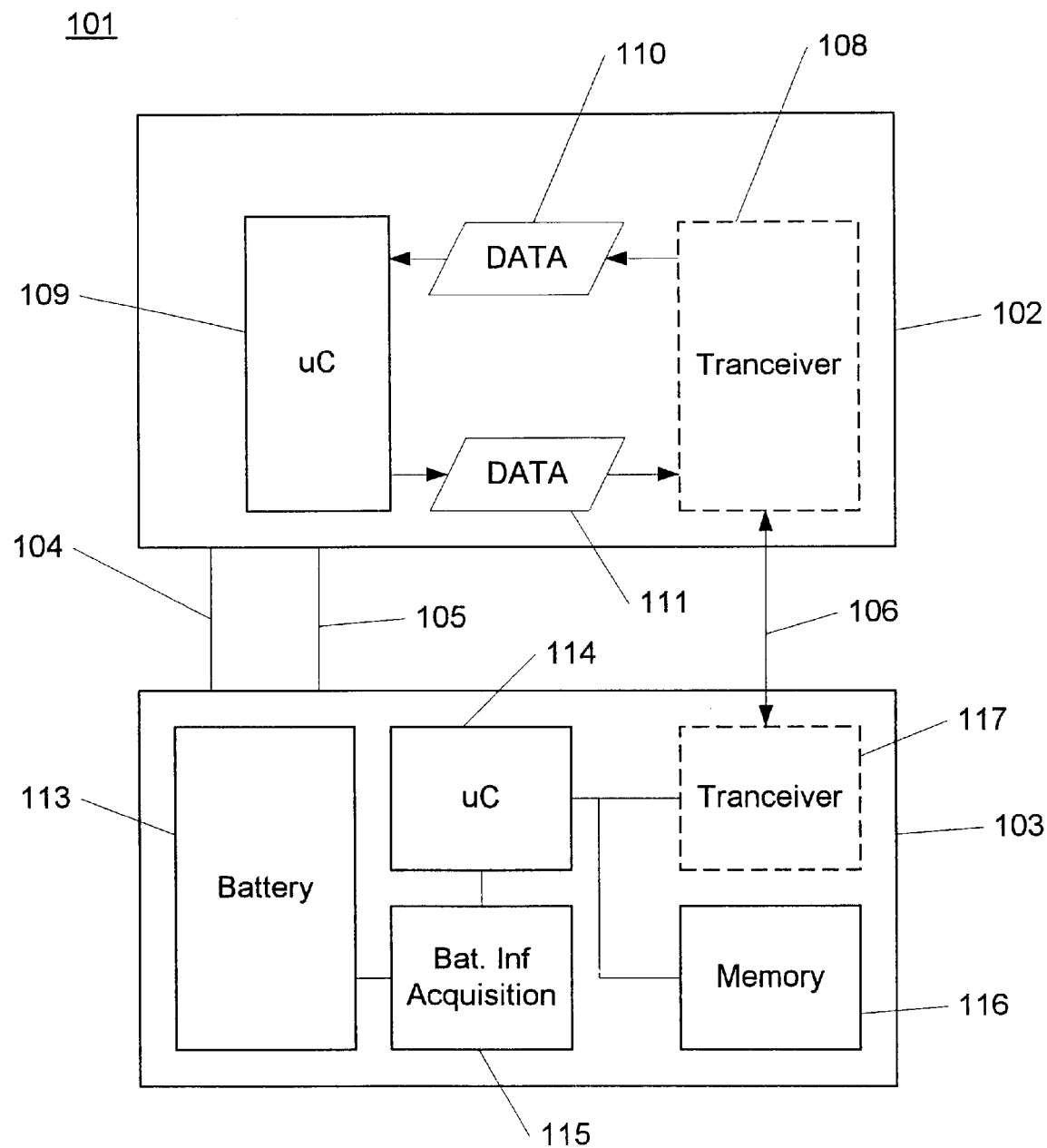
FIG. 1 shows an apparatus according to the invention.

FIG. 1 shows an apparatus 101 comprising an electronic device 102 and a battery or battery pack 103 attached thereto. The apparatus 101 further comprises a number of connections 104, 105, 106 connecting the electronic device 102 and the battery 103 and thus allowing communication between the electronic device 102 and the battery 103.

The electronic device 102 comprises a transceiver 108, which is also called the first communications means in the following, and a micro-controller 109. The transceiver 108 and the micro-controller 109 are adapted to exchange data, which is illustrated by means of the reference sign 110 and 111 in the figure. The micro-controller 109 can transmit information to the transceiver 108 by means of the connection 111. Likewise the connection 110 can be used to transmit data from the transceiver 108 to the micro-controller 109. The transceiver 108 may be a universal asynchronous receiver transmitter (UART).

The battery includes one or more battery cells 113, a micro-controller 114 (which may be a state machine), a battery information acquisition unit 115, a transceiver 117 and a memory 116. It is noted that the transceiver 117 is also called the second communications means in the following. Also the transceiver 117 may be a universal asynchronous receiver transmitter (UART).

The connections 104 and 105 are used to supply power from the battery 103 to the electronic device 102. For example the connector 104 may be connected to the positive pole of the battery cells 113 in the battery 103, and the connector 105 may be connected to a battery negative pole (GND) of the battery cells 113 in the battery 103.

The transceiver 108 included in the electronic device 102 is connected to the transceiver 117 in the battery 103 by means of the connection 106 enabling digital, serial communication comprising transmission of bytes consisting of a number of bits between the first and the second communications means. The memory 116 is adapted to store a number of data information, for example an identification number of the battery, the maximum capacity of the battery, the current capacity of the battery, etc.

The micro-controller 114 is connected to the transceiver 117, to the battery information acquisition unit 115, and to the memory 116. The battery information acquisition unit 115 is connected to the battery cells 113 and is adapted to retrieve battery information, such as the current battery capacity, etc. from the battery cells 113. The battery information acquisition unit 115 is adapted to transmit the information to the micro-controller 114 when instructed to do so by the micro-controller 114. The micro-controller 114 is adapted to store and retrieve the information from the memory 116 and to transmit the information to the electronic device 102 by means of the transceiver 117.

Figure 2:
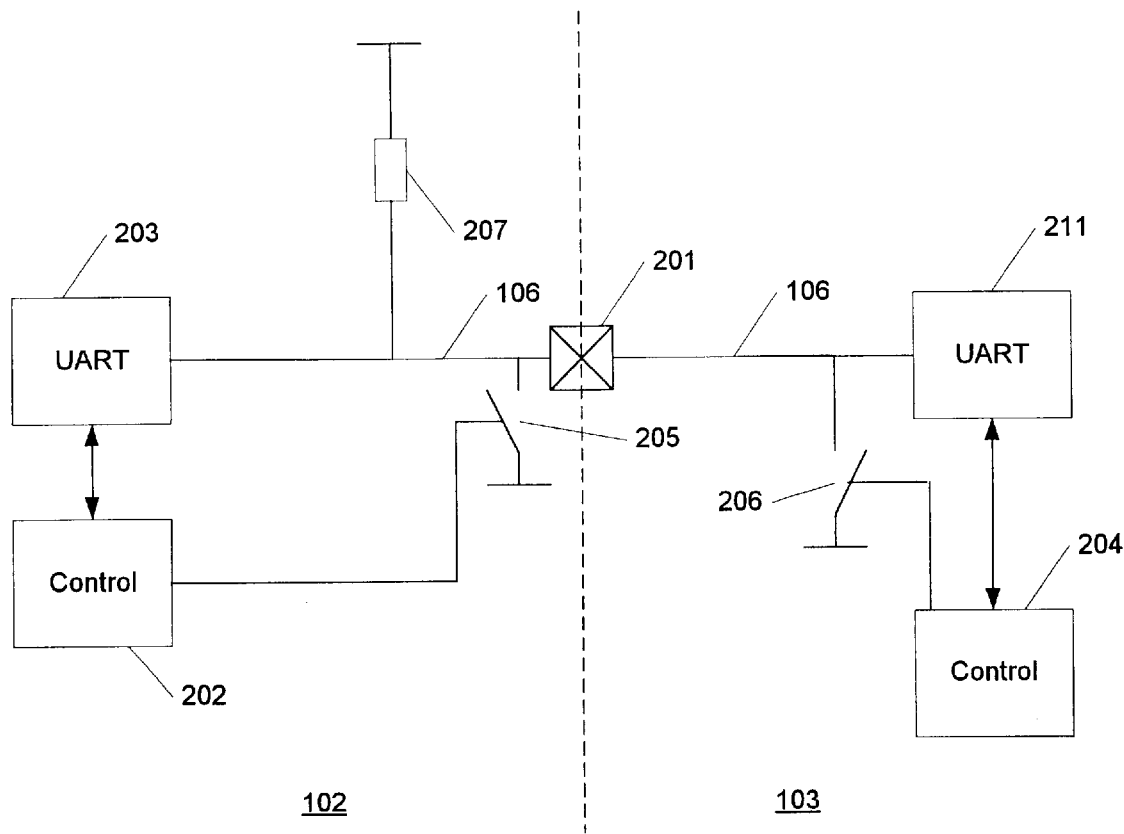
FIG. 2 illustrates a part of an electronic device interfacing with a part of the battery.

FIG. 2 illustrates a part of the electronic device 102 interfacing with a part of the battery 103 and shows the connection 106 adapted to connect the electronic device 102 and the battery 103 in relation to the connection 106 shown in FIG. 1. The left side of FIG. 2 illustrates a part of the electronic device 102 while the right side of FIG. 2 illustrates a part of the battery 103. As shown in the figure, the electronic device 102 and the battery 103 are connected by means of an interface 201.

The electronic device 102 includes a control unit 202 and a universal asynchronous receiver transmitter unit 203, i.e. a so-called UART. Likewise, the battery 103 includes a control unit 204. The electronic device 102 and the battery 103 are adapted to transmit data via the interface 201. The transmission is performed by means of a pull-up resistor 207, a switch 205, and a switch 206. The switch 205 in the electronic device is connected to be controlled by the control unit 202. Likewise, the switch 206 in the battery 103 is connected to be controlled by the control unit 204.

The switch 205 and the switch 206 are both connected to ground potential. This enables the control units 202, 204 to transmit information over the interface 201 in turn. The transmission of information from the electronic device 102 to the battery 103 is controlled by the control unit 202. The control unit 202 is adapted to control the switch 205 and hereby send the information to the battery 103. For example, when the switch 205 is open, the pull-up resistor 207 pulls the potential at the communications line 106 to a high level. On the other hand, when the switch is closed, the potential at the communication line 106 is at a low level. Hereby, by controlling the position of the switch 205 the control unit 202 controls the potential at the communications line 106, and as the communication line is connected to the battery 103 information can be transmitted from the electrical device 102 to the battery 103.

Likewise, the control unit 204 can transmit information from the battery 103 to the electronic device 102 by means of the switch 206. The data generated by the switch 205 in the electronic device 102 are received in a UART 211 which can be similar to the UART 203 in the electronic device 102.

In a preferred embodiment, bytes including a number of bits are transmitted between the electronic device 102 and the battery 103. The format of these bytes is illustrated in FIG. 3.

Figure 3:
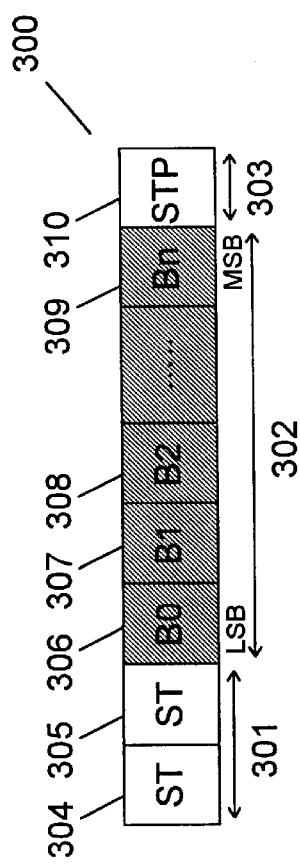
FIG. 3 is an example of a byte to be used in relation to the above mentioned transmission.

FIG. 3 shows an example of a byte consisting of a number of bits which can be used in relation to the above-mentioned transmission. The byte 300 is divided into three sections: a first section 301 including two start bits, a second section 302 including a number of data bits, and a third section 303 including a stop bit.

The first section 301 includes two start bits 304, 305 and is used to indicate the start of the byte 300 during transmission. Preferably, the start bits have different values, e.g. the start bit 304 is a logic "0" while the start bit 305 is a logic "1". The second section 302 includes a number of data bits (for example eight) having values depending on the information being transmitted. The third section 303 includes a stop bit used to indicate the end of the byte. As will become clear from the following, the stop bit is often not necessary, e.g. when the transmitted bytes are separated by periods having a signal level corresponding to the value of the stop bits, or when bytes transmitted have a fixed length.

Figure 4:
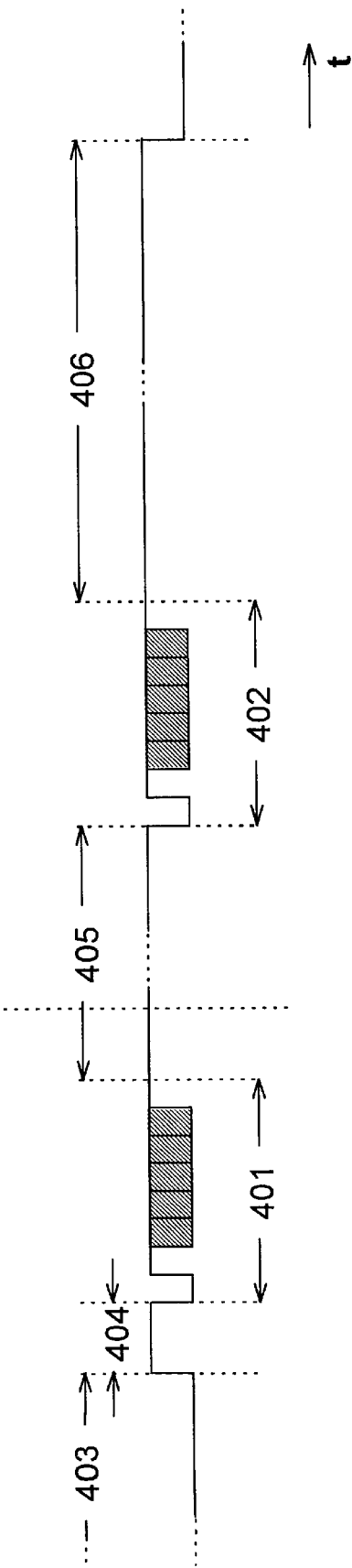
FIG. 4 illustrates the transmission of bytes.

FIG. 4 is a timing diagram illustrating the transmission of bytes over the communications line 106 between the electronic device 102 and the battery 103. Note that the time is increasing from the left to the right in the figure.

The figure shows a first byte 401 being transmitted from electronic device 102 to the battery 103 via the communication line 106 followed by a second byte 402 being transmitted in the reverse direction via the communications line 106, i.e. from the battery 103 to the electronic device 102.

The time intervals illustrating the transmission of the first byte and the transmission of the second byte are separated by a time interval indicated by 405 in the figure. The duration of the time interval 405 is specified by the required response time and minimum set-up time for reversing the direction of communication.

One or more of the electronic means in the battery, e.g. the micro-processor 114 can be in an active state or in a power saving state. In the power saving state the communication line is in a so-called idle state. Hereby, the power consumption of these electronic means can be reduced during periods when no bytes are transmitted between the electronic device 102 and the battery 103.

Prior to the transmission of the first byte the transmission line is in idle state in which the signal level on the transmission line equals a level of logic "0". In the figure the idle period situation is indicated by the reference sign 403. The control unit 202 brings the transmission line into an so-called active state by bringing the signal level on the transmission line 106 to a high level as indicated by the period 404 in the figure. The period 404 is a so-called wake-up period in which one or more of the electronic means in the battery are brought from a power saving state to a normal power consumption state.

As illustrated to the right in the figure, the byte 402 is followed by a an interval 406 in which the signal level at the transmission line 106 equals a level of logic "1", i.e. a situation similar to the situation indicated by the interval 405. The minimum duration of the time interval 406 is specified by the required response time and minimum set-up time for reversing the direction of communication. The interval 406 is followed by a shift from the level of logic "1" to a level of logic "0" indicating a situation in which the transmission line 106 is brought into an idle state. Alternatively, the shift could be indicating the start of a new byte being transmitted, i.e. the shift corresponds to the beginning of a new start bit. It is noted that the transmission line can be brought into an idle state when the duration of the time interval 406 exceeds a given predefined value.

The bytes transmitted via the transmission line 106 can include instructions as well as data. The instructions may include so-called read-only instructions sent by the electronic device 102 and instructing the battery 103 to read specified information from the memory 116 and send the information as one or more data bytes in response.

For example, the read-only instruction may instruct the battery to send information on the nominal capacity or the battery serial number. The instruction may also include so-called read/write instructions. For example instructions causing reading or writing the presently remaining capacity of the battery. Further, the instruction set may include instructions causing sending and receiving information of the battery communications bus revision, and causing reading and writing of a dynamic identification number.

The revision information specifies the communications bus revision supported. After exchanging the revision number of the battery communications bus, the micro-controllers 109, 114 can use a common communications standard supported by both the electronic device 102 and the battery 103. Hereby, communication between an electronic device 102 and a battery can be obtained even if one of those only supports a later communications standard than the other.

The dynamic identification number is used for communication purposes. The electronic device 102 is adapted to store a given dynamic identification number in both the memory 116 of the battery 103 and in a memory of the electronic device 102. The dynamic identification number may be stored when a battery 103 is connected to the electronic device 102 but can also be stored at an arbitrary time, provided the battery 103 is connected to the electronic device 102.

When the battery is connected to the electronic device 102 the dynamic identification number is transmitted from the battery 103 to the electronic device 102. Hereafter, the dynamic identification number from the battery 103 is compared to one or more dynamic identification numbers stored in the electronic device 102. If the dynamic identification number of the battery does not correspond to a dynamic identification number from the electronic device 102, it means that the battery has been used by other equipment or it may be a completely brand new battery. Therefore, the electronic device 102 does not have current information about the status of the battery, and the electronic device will retrieve information from the battery 102, e.g. information about the presently remaining capacity of the battery 102. If, on the other hand, the dynamic identification number of the battery corresponds to a dynamic identification number from the electronic device 102, the battery has not been used by other equipment, and the electronic device may use information on the battery stored in the electronic device instead of information retrieved from the battery. Whether the information from the electronic device. 102 or information from the battery 103 is used depends on other information stored in the battery 103, e.g. information indicating if the battery has been recharged since being disconnected from the electronic device. If this is the case, the mobile phone retrieves the battery capacity from the battery. If this is not the case, the mobile phone uses previously stored internal information on the battery capacity instead. The reason why it is of interest to use internally stored information instead of information from the battery is that the electronic device is normally able to store the information with a higher resolution because of the greater available memory.

It is noted that the electronic device may be a mobile phone or a battery charger. For example, both a mobile phone and a battery charger may perform the above-mentioned reading and writing of dynamic identification numbers and on this basis decide whether to use previously stored information about the battery 103 or alternatively retrieve the information from the battery 103.

Error handling is essentially based upon an echoing mechanism used for commands and data, i.e. retransmission in relation to commands and data. Referring to FIG. 4, the first byte 401 may be transmitted by the electronic device 102 to the battery 103. When the byte 401 is received by the battery 103, the byte is re-transmitted as the byte 402 from the battery 103 to the electronic device 102. When the byte 402 is received in the electronic device 102, the byte 402 is compared with the byte 401 originally sent. If the bytes 401 and 402 do not coincide an error is detected.

In relation to write commands, re-transmission can be carried out in the following way. Firstly, the byte 401 sent by the electronic device 102 is received by the battery 103. Secondly, the received byte is written into a non-volatile memory 116 of the battery 103. Thirdly, the byte is read from the battery non-volatile memory. And finally, the read byte is retransmitted from the battery 103 to the electronic device 102 and the error detection can be performed. Thus it is also checked that the byte was correctly written into the memory 116.

Note, the above mentioned error detection can also be performed on bytes transmitted from the battery 103 to the electronic device 102.

Now referring to FIG. 4, the bytes transmitted between the electronic device and the battery include a first start bit 304 (logical "0") and a second start bit 305 (logical "1"). The start bit is used for synchronizing a hardware timer in the battery 103 in accordance with a received signal, as shown in FIG. 5.

Figure 5:
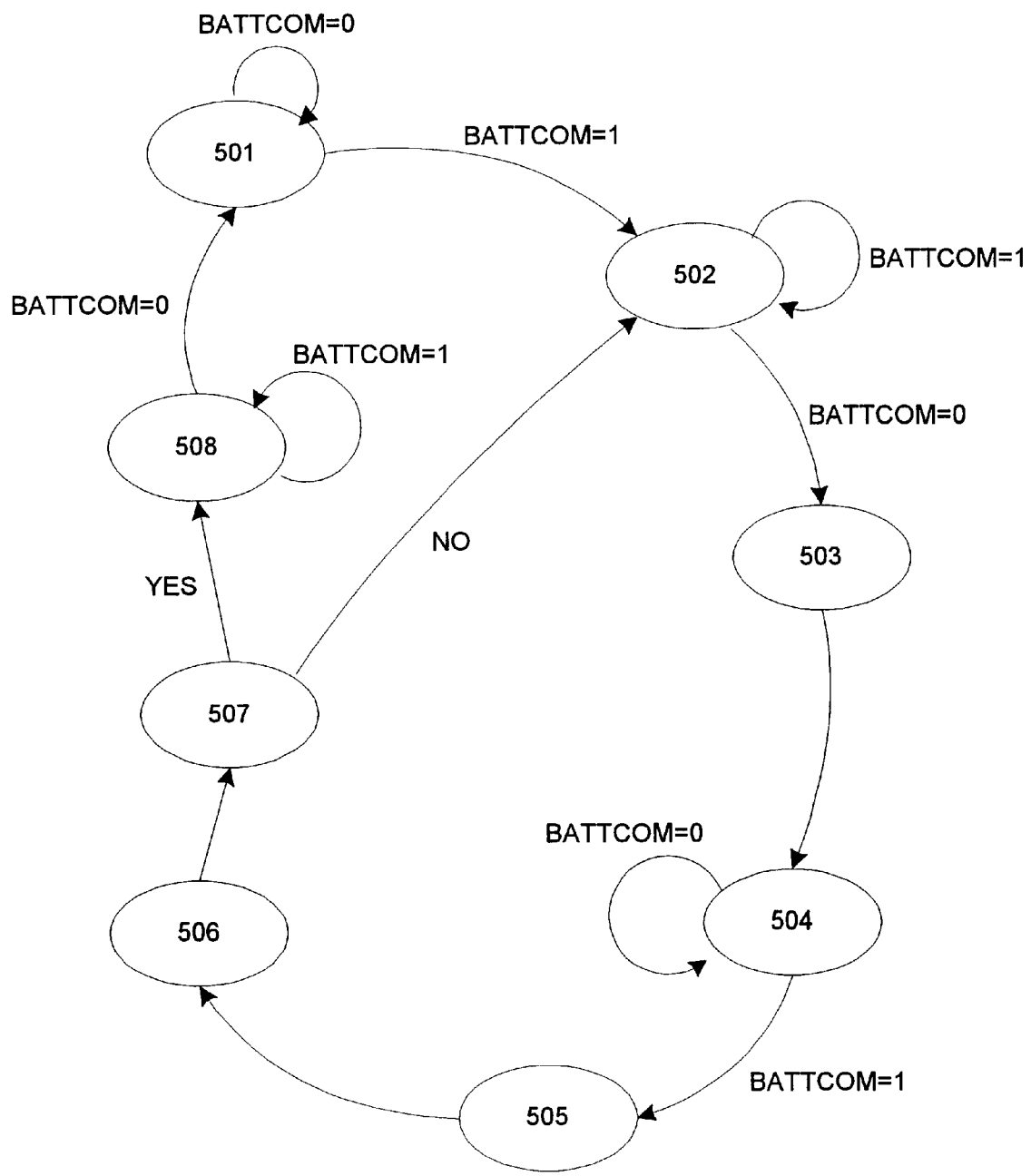
FIG. 5 is a state diagram illustrating the synchronisation of an oscillator in the battery.

FIG. 5 is a state diagram illustrating the synchronization of an oscillator in the battery by means of received bytes. In the standby state 501, i.e. when the transmission line 106 is in an idle state, the signal level on the transmission line 106 (which is also called "BATTCOM") corresponds to logical "0", i.e. BATTCOM=0. As long as BATTCOM=0, the state is a standby state 501. When the shift to BATTCOM=1 occurs, i.e. when the signal level on the transmission line 106 reaches a value corresponding to logical "1", state 502 is reached. Referring to FIG. 4, the state 502 occurs during the wake-up period 404. As long as BATTCOM=1, the state remains.

When the shift to BATTCOM=0 occurs, state 503 is reached. Referring to FIG. 4, this situation occurs when the shift specifying the beginning of the first start bit 304 in a transmitted byte 401 occurs. When this state is reached, a hardware timer is initiated and started. It is noted that the hardware timer which is located in the battery 103 is not illustrated in the FIG. but may for example be included in the micro-controller 114. Hereafter the state 504 is reached. This state remains as long as BATTCOM=0, i.e. for a time interval equal to the width (time) of the first start bit. When a shift to BATTCOM=1 occurs, i.e. when the shift to the second start bit 305 occurs, the state 505 is reached. The timer value is read from the hardware timer and stored in the memory 116, and state 506 is reached.

In state 506 the stored timer value and the hardware timer are used for synchronizing the reception of the remaining bits of the transmitted byte and, if one or more bytes are to be transmitted from the battery 103 to the electronic device 102 in response, for transmitting these bytes. Hereafter, the state 507 is reached. If the communications sequence is not finished, the state 502 is reached, i.e. waiting for a first start bit to occur. On the other hand, if the communications sequence is finished, the state 508 is reached. As long as BATTCOM=1, this state remains. When the shift to BATTCOM=0 occurs, state 501 is reached.

As mentioned, said synchronizing can be performed using a timer which, as a result of the continuous synchronization and the consequently lower requirement for permanent stability of the oscillating frequency, can be clocked by means of a simple, low cost oscillator. The oscillator may e.g. be an RC oscillator. Therefore, the battery 103 can be produced without expensive crystals, which is of interest when cost optimizing the production of batteries and electronic devices including batteries.

Preferably, all bytes include the start bits to be used for synchronizing the hardware timer in accordance with the received signal. But, depending on the oscillator, if is stable enough to remain synchronized for a long period, all bytes do not necessarily have to include the start bytes for synchronizing purposes.

Although a preferred embodiment of the present invention has been described and shown, the invention is not restricted to it. It may also be embodied in other ways within the subject-matter defined in the following claims. For example, the number of start bits may be included in the transmitted bytes, and therefore the synchronization using the timer can be based on a larger time interval than the duration of a single bit.

What is claimed is:

1. A method of synchronizing a second communications means in a battery attached to an electronic device to a first communications means in said electronic device, wherein bytes consisting of a number of bits are transmitted between said electronic device and said battery by means of said first and second communication means using a digital, serial communication, the method comprising;

appending a predetermined bit sequence to at least some bytes prior to the transmission from said first communications means to said second communications means;

detecting said bit sequence in a signal received by said second communications means; and measuring a time interval between given shifts in the detected bit sequence, and said synchronization is performed by means of said measured time interval.

2. A method according to claim 1, wherein said appended bit sequence is transmitted prior to the transmission of the remaining bits in said byte, and said synchronization is performed prior to receiving said remaining bits.

3. A method according to claim 2, wherein at least one of said bytes does not include an appended predetermined bit sequence.

4. A method according to claim 2, wherein said bit sequence includes two bits of different values, and said time interval is specified by a shift defining a beginning of a first bit and a shift between said two bits.

5. A method according to claim 2, wherein every one of said bytes includes said appended predetermined bit sequence.

6. A method according to claim 1, wherein said bit sequence includes two bits of different values, and said time interval is specified by a shift defining a beginning of a first bit and a shift between said two bits.

7. A method according to claim 6, wherein every one of said bytes includes said appended predetermined bit sequence.

8. A method according to claim 6, wherein at least one of said bytes does not include an appended predetermined bit sequence.

9. A method according to claim 1, wherein every one of said bytes includes said appended predetermined bit sequence.

10. A method according to claim 1, wherein at least one of said bytes does not include an appended predetermined bit sequence.

11. An apparatus, comprising;

an electronic device;

a battery attached thereto;

means enabling digital, serial communication over an interface between the electronic device and the battery;

first communications means in the electronic device; and second communications means in the battery, said digital, serial communication comprising transmission of bytes having a number of bits between said first and second communications means, wherein said first communications means is adapted to append a predetermined bit sequence having at least two shifts to at least some bytes prior to the transmission to said second communications means, said second communications means is further adapted to detect said bit sequence in a received signal, to measure the time interval between given shifts in said bit sequence, and to synchronize said second communications means with said first communications means by means of said measured time interval.

12. An apparatus according to claim 11, wherein said first communications means is adapted to transmit said appended bit sequence prior to transmission of the remaining bits in said byte, and said second communications means is adapted to perform said synchronization prior to receiving said remaining bits.

13. An apparatus according to claim 12, wherein said electronic device is a cellular telephone.

14. An apparatus according to claim 12, wherein said first communications means is adapted to append said predetermined bit sequence to some of said bytes, while other bytes are not appended to said predetermined bit sequence.

15. An apparatus according to claim 12, wherein said first communications means is adapted to append a predetermined bit sequence including two bits of different values, and said second communications means is adapted to perform said synchronization based on a time interval specified by a shift defining the beginning of the first bit and a shift between said two bits.

16. An apparatus according to claim 12, wherein said first communication means is adapted to append said predetermined bit sequence to every one of said bytes.

17. An apparatus according to claim 11, wherein said first communications means is adapted to append a predetermined bit sequence including two bits of different values, and said second communications means is adapted to perform said synchronization based on a time interval specified by a shift defining the beginning of the first bit and a shift between said two bits.

18. An apparatus according to claim 17, wherein said first communication means is adapted to append said predetermined bit sequence to every one of said bytes.

19. An apparatus according to claim 17, wherein said first communications means is adapted to append said predetermined bit sequence to some of said bytes, while other bytes are not appended to said predetermined bit sequence.

20. An apparatus according to claim 17, wherein said electronic device is a cellular telephone.

21. An apparatus according to claim 11, wherein said first communication means is adapted to append said predetermined bit sequence to every one of said bytes.

22. An apparatus according to claim 21, wherein said electronic device is a cellular telephone.

23. An apparatus according to claim 11, wherein said first communications means is adapted to append said predetermined bit sequence to some of said bytes, while other bytes are not appended to said predetermined bit sequence.

24. An apparatus according to claim 23, wherein said electronic device is a cellular telephone.

25. An apparatus according to claim 11, wherein said electronic device is a cellular telephone.

26. A battery, comprising:

means enabling digital, serial communication over an interface between a battery and an electronic device; and communications means in the battery, wherein said digital, serial communication comprises transmission of bytes having a number of bits to and from said communication means, and wherein said communications means includes synchronization means adapted to detect a predetermined bit sequence in a received byte, to measure a time interval between given shifts in said bit sequence, and to synchronize said communication means in accordance with the measured time interval.

* * * * *

UNITED STATES PATENT AND TRADEMARK OFFICE
CERTIFICATE OF CORRECTION

PATENT NO. : 6,677,727 B1
DATED : January 13, 2004
INVENTOR(S) : Heino Wendelrup et al.

It is certified that error appears in the above-identified patent and that said Letters Patent is hereby corrected as shown below:

Title page,
Item [56], References Cited, U.S. PATENT DOCUMENTS, delete "7,291,966" insert -- 6,291,966 --.

Signed and Sealed this

Twenty-seventh Day of September, 2005

JON W. DUDAS
*Director of the United States Patent and Trademark Office*